US012544691B2

(12) United States Patent
Clemes

(10) Patent No.: US 12,544,691 B2
(45) Date of Patent: Feb. 10, 2026

(54) FOG (FATS, OIL, OR GREASE) SEPARATOR APPARATUS

(71) Applicant: ECO CLARITY LTD., London (GB)

(72) Inventor: Christopher Charles Clemes, London (GB)

(73) Assignee: ECO CLARITY LTD., London (GB)

( * ) Notice: Subject to any disclaimer, the term of this patent is extended or adjusted under 35 U.S.C. 154(b) by 398 days.

(21) Appl. No.: 18/250,142

(22) PCT Filed: Oct. 18, 2021

(86) PCT No.: PCT/IB2021/059549
§ 371 (c)(1),
(2) Date: Apr. 21, 2023

(87) PCT Pub. No.: WO2022/084818
PCT Pub. Date: Apr. 28, 2022

(65) Prior Publication Data
US 2023/0398470 A1 Dec. 14, 2023

(30) Foreign Application Priority Data
Oct. 21, 2020 (ZA) .................................. 2020/05234

(51) Int. Cl.
B01D 17/02 (2006.01)
B01D 17/04 (2006.01)
(Continued)

(52) U.S. Cl.
CPC ..... B01D 17/0214 (2013.01); B01D 17/0205 (2013.01); B01D 17/0211 (2013.01);
(Continued)

(58) Field of Classification Search
CPC ............ B01D 17/0214; B01D 17/0205; B01D 17/0211; B01D 17/042; B01D 17/12;
(Continued)

(56) References Cited

U.S. PATENT DOCUMENTS 4,780,201 A * 10/1988 Keeter ............... B01D 21/2444
210/512.1
5,431,826 A * 7/1995 Becker ............... B01D 17/0214
210/742
(Continued)

FOREIGN PATENT DOCUMENTS

DE 29504779 U1 11/1995

OTHER PUBLICATIONS

International Preliminary Report on Patentability for PCT/IB2021/059549, mailed Apr. 13, 2023, 5 Pages.
(Continued)

Primary Examiner — Liam Royce
(74) Attorney, Agent, or Firm — Riverside Law LLP

(57) ABSTRACT

A FOG (Fats, Oil, or Grease) separator apparatus includes (1) a first reservoir or chamber having a wastewater inlet configured to receive wastewater containing FOG; (2) a second reservoir or chamber which is separated from the first reservoir by a first 5 weir configured to permit overflow of at least FOG from the first reservoir to the second reservoir; and (3) a third reservoir or chamber separated from the second reservoir by a second weir configured to permit overflow of at least FOG from the second reservoir to the third reservoir.

18 Claims, 5 Drawing Sheets

(51) Int. Cl.
*B01D 17/12* (2006.01)
*C02F 1/00* (2023.01)
*C02F 1/02* (2023.01)
*C02F 1/24* (2023.01)
*C02F 1/40* (2023.01)
*C02F 1/78* (2023.01)
*E03F 5/16* (2006.01)
*C02F 101/16* (2006.01)
*C02F 101/20* (2006.01)
*C02F 101/32* (2006.01)
*C02F 103/32* (2006.01)

(52) U.S. Cl.
CPC ........... *B01D 17/042* (2013.01); *B01D 17/12* (2013.01); *C02F 1/008* (2013.01); *C02F 1/02* (2013.01); *C02F 1/24* (2013.01); *C02F 1/40* (2013.01); *E03F 5/16* (2013.01); *C02F 1/78* (2013.01); *C02F 2101/16* (2013.01); *C02F 2101/20* (2013.01); *C02F 2101/32* (2013.01); *C02F 2103/32* (2013.01); *C02F 2201/007* (2013.01); *C02F 2209/008* (2013.01); *C02F 2209/42* (2013.01)

(58) Field of Classification Search
CPC .... E03F 5/16; C02F 1/008; C02F 1/02; C02F 1/24; C02F 1/40; C02F 1/78; C02F 2101/16; C02F 2101/20; C02F 2101/32; C02F 2103/32; C02F 2201/007; C02F 2209/008; C02F 2209/42; C02F 2209/01; C02F 2209/02; C02F 2209/40; C02F 2303/26

See application file for complete search history.

(56) References Cited

U.S. PATENT DOCUMENTS

| | | | |
|---|---|---|---|
| 5,804,081 A * | 9/1998 | DeGesero | B01D 17/0211 210/170.03 |
| 6,238,572 B1 * | 5/2001 | Batten | B01D 17/0214 210/801 |
| 6,413,435 B1 * | 7/2002 | Kyles | B01D 17/00 210/194 |
| 8,372,274 B2 | 2/2013 | Early | |
| 2006/0076300 A1 * | 4/2006 | Mitchell | E03F 1/002 210/538 |

OTHER PUBLICATIONS

International Search Report for PCT/IB2021/059549, mailed Jan. 18, 2022, 3 Pages.
Written Opinion for PCT/IB2021/059549, mailed Jan. 18, 2022, 4 Pages.

* cited by examiner

FOG (FATS, OIL, OR GREASE) SEPARATOR APPARATUS

FIELD OF INVENTION

The invention relates generally to treatment of contaminated water, specifically water containing Fats, Oil, or Grease (FOG). The invention relates to a FOG separator apparatus for separating FOG from wastewater.

BACKGROUND OF INVENTION

Wastewater FOG is produced, e.g., by meat fats in food scraps, cooking oil, lard, butter, gravy, and food products. Wastewater from food source and food service facilities such as restaurants, processing plants, factories, food courts and hotels are often referred to as "greywater". The terms "greywater", "wastewater" and "effluent" may be used substantially interchangeably. FOG is not necessarily produced only from food preparation, but it is a common source.

When greywater passes through sewer systems, FOG accumulates inside the pipes, eventually restricting flow with the potential of causing untreated wastewater to back up into businesses and homes, resulting in high clean up and restoration costs and fines. When discharged into septic systems and drain fields, FOG can cause malfunctions, resulting in more frequent tank pump-outs and other expenses. Additionally, manholes can overflow into parks, yards, streets, and storm drains, allowing wastewater to contaminate local waters, including drinking water. Exposure to untreated FOG may also be a health hazard.

In response, businesses attempt to reduce their FOG discharge through the use of, e.g., grease traps. However, it is typically not practical to pump grease traps on a continual basis. Even if a grease trap is pumped on a monthly or weekly basis, in that time, significant portions of the grease will break down and turn septic. Not only does the grease have an offensive smell, but it will sink and pass out of the grease trap adding to the BOD (Biochemical Oxygen Demand) and COD (Chemical Oxygen Demand) at the local sewer plant or contaminate and foul sand mounds or fields of on-lot systems.

Some inventions have been devised to collect and concentrate FOG. The Applicant own PCT application no. PCT/IB2020/050334 discloses a FOG collector.

The Applicant now desires an apparatus which can separate or collect FOG from residual water or wastewater.

SUMMARY OF INVENTION

The invention provides a FOG separator apparatus which includes:
- a first reservoir or chamber having a wastewater inlet configured to receive wastewater containing FOG;
- a second reservoir or chamber which is separated from the first reservoir by a first weir configured to permit overflow of at least FOG from the first reservoir to the second reservoir;
- a third reservoir or chamber separated from the second reservoir by a second weir configured to permit overflow of at least FOG from the second reservoir to the third reservoir;
- a syphon arrangement having a syphon inlet provided in the third reservoir at a first level and having a syphon outlet provided outside the third reservoir at a second level which is higher than the first level; and
- a pump arrangement comprising a FOG pump and a sensor provided in the third reservoir at a third level which is higher than the second level, wherein the pump has a pump inlet in the third reservoir above the first level, and wherein the pump is activated by the sensor in response to a liquid level or concentration in the third reservoir triggering the sensor.

The syphon arrangement may be a self-priming syphon arrangement. The syphon arrangement may be primed, and start syphoning, in response to a liquid level in the third reservoir being at or rising above the second level. The syphon arrangement may stop (e.g., experience a syphon break) in response to the liquid level in the third reservoir being at or falling below the second level. The syphon arrangement may include a pump and/or valve to regulate flow.

The sensor may be in the form of a capacitive sensor. The capacitive sensor may be adjustable externally and may also be configured to sense FOG concentrations, not just generic liquid level. Accordingly, the term "liquid level" in the context of this specification includes when a specified FOG concentration reaches the sensor.

The FOG separator apparatus may include one or more heaters. The heaters may be provided in one or more of the first reservoir, the second reservoir, and/or the third reservoir. The heaters may be configured to warm or heat liquid (e.g., wastewater containing FOG or just FOG). The liquid may be warmed or heated to 40° C.-60° C. but may go as high as 80° C., e.g., about 50° C.

It will be appreciated that FOG is generally less dense than water and accordingly wastewater containing FOG tends to stratify or separate naturally into FOG at a higher level and water at a lower level. It is this natural stratification of FOG and water which the FOG separator apparatus, and specifically the first, second, and third levels, may be configured to exploit.

The FOG separator apparatus may include an electronic controller. The FOG separator apparatus may include one or more sensors communicatively coupled to the electronic controller.

With density-based stratification in mind, the syphon arrangement may be configured to syphon predominantly water (or wastewater) from the third reservoir. The syphon intake is at the first level, which is the lowest level (compared to the second and third levels), which is where water is more likely to occur. The syphon arrangement may be configured to stop syphoning when the liquid level in the third reservoir falls below the second level. Correspondingly, the pump arrangement may be configured to pump out predominantly FOG from the third reservoir because the pump inlet is above the second level. However, the pump is only activated when the liquid level in the third reservoir reaches the third level, which may ensure that there is sufficient FOG to justify activating the pump.

The respective flow rates of the FOG over the second weir, the pump, and the syphon arrangement may be configured to ensure that the pump inlet predominantly receives FOG while the syphon inlet predominantly receives water.

The FOG separator apparatus may include a screen or mesh, e.g., a particulate matter screen, provided between the first and second reservoirs. The screen may be provided before, e.g., immediately before, or at, the first weir.

The third reservoir may be contained or nested within the second reservoir.

The FOG separator apparatus may include additional weirs, reservoirs, and screens. The FOG separator apparatus may include a fourth reservoir or chamber. The fourth reservoir or chamber may be separated from the second reservoir by a third weir. The syphon outlet may be provided in the fourth reservoir. Wastewater syphoned by the syphon arrangement may be deposited into the fourth reservoir and permitted to overflow the third weir and return to the second reservoir. The more FOG is present in the wastewater, the more the FOG will rise to the surface, and the more the FOG may be returned from the fourth reservoir to the second reservoir. Accordingly, the fourth reservoir may serve as a feedback loop to recirculate wastewater (which may contain FOG) to the second reservoir via the third weir, to concentrate the FOG extracted from the pump of the third reservoir.

A height or level of the third weir may be adjustable. This may permit tuning or adjustment of the overflow of this weir and may thereby assist in regulating an output and/or a concentration of FOG from the FOG separator apparatus.

The first and second weirs may be at the same level. The first weir and/or the second weir may be above the third level.

The pump inlet may be between the first level and the weir level. The pump inlet may be between the first level and the third level. The pump inlet may be between the first level and the second level; instead, the pump inlet may be at, or higher than, the second level.

The third level (the sensor or liquid level switch) may be about 10% higher, relative to a height of the third reservoir, than the second level (the syphon outlet).

The first reservoir and the second reservoir may be fluidically connected not only by the first weir. The apparatus may include a first wall which defines the first weir, and which separates the first and second reservoirs from each other. The first wall may define one or more apertures or vents, at one or more levels beneath the first weir, to permit wastewater containing FOG to flow from the first reservoir to the second reservoir over the first weir but also through the apertures. The apertures may include upper apertures (nearby the first weir) as well as lower apertures (away from the first weir towards a bottom of the first wall). This may allow wastewater containing FOG to flow into the second chamber (1) from near the top of the first weir, and (2) from over the top of the first weir and for water in the first chamber to flow out (3) from the bottom of the first wall into the second chamber. This may allow separation or screening to happen between the first and second chambers.

By including the apertures or vents, separation may be allowed to occur in the first reservoir formed by the first wall. Striated levels of wastewater containing FOG may flow with the most concentrated FOG flowing over the top of the first weir, wastewater containing high levels of FOG flowing through the apertures near the top of the first weir, and waste water containing little, if any, FOG flowing through apertures at the bottom of the first wall.

The pump may direct the FOG away from the reservoirs. The pump may direct the FOG to an external FOG treatment (e.g., processing) system. The FOG may be concentrated FOG and the FOG separator apparatus may therefore be considered a FOG concentrator.

The FOG separator apparatus may include an enclosure to accommodate the reservoirs. The enclosure may include various conduits or ports to accommodate the various inlets and outlets. The enclosure may be rectangular. The enclosure may be a similar shape and size as, or may in fact be, a standard shipping container. The enclosure may be an outer enclosure.

The FOG separator apparatus may include a lining or shell provided inside the enclosure. The lining or shell may provide some of the structure defining some of the reservoirs. For example, the lining or shell may provide a base of the first and second (and fourth, if present) reservoirs. The base may be a V-shaped which may funnel the water containing very little FOG, which may or may not be colder than the upper FOG-rich levels, to flow through and out the apparatus without mixing with the warmer layers above. This may make separation and energy usage in the apparatus more efficient.

Additional weirs, sieves, or screens may be provided prior to the first chamber (e.g., for pre-filtering or pre-screening).

The FOG separator apparatus may be modular. Plural FOG separator apparatus may be linked, e.g., in parallel and/or in series.

The FOG separator apparatus of the present disclosure may be linked to the FOG collector disclosed in PCT/IB2020/050334. The wastewater inlet of the FOG separator apparatus of the present disclosure may be connected to a collector output of the FOG collector disclosed in PCT/IB2020/050334. The syphon outlet and/or the second and/or fourth reservoirs of the present disclosure may provide wastewater as an input to the FOG collector disclosed in PCT/IB2020/050334.

The invention extends to a FOG separator assembly comprising the FOG separator apparatus as defined above connected to FOG collector as claimed in PCT/IB2020/050334, the FOG separator assembly and the FOG collector being cyclically connected in that (1) the wastewater inlet of the FOG separator apparatus is connected to a collector output of the FOG collector and a main outlet of the FOG separator apparatus is connected to a fluid inlet of the FOG collector.

The assembly may be configured to cycle wastewater containing FOG from its source, through the assembly, removing the FOG in real-time, then reintroducing warmed wastewater back into the surface FOG containing layer of the wastewater containing FOG receptacle to facilitate the separation through an ongoing continuous cycle. This may iterate until the FOG is removed, and then goes into a "maintenance, low energy mode" where the FOG separator assembly system is kept warm, awaiting the next load of wastewater containing FOG to arrive.

By way of development, the Applicant has trialled use of bubbles, e.g., nano bubbles. Accordingly, the FOG separator apparatus may include a bubble generator to generate bubbles in one or more of the reservoirs (e.g., the first and/or second reservoirs). The bubble generator may be configured to provide bubbles of primarily $O_2$ or $O_3$. The bubbles may help draw FOG to the surface and separate it. The bubble generator may include one or more pipes provided in, towards a bottom of, the one or more reservoirs.

The pipes may have small holes running along their lengths. When the bubbles are released along the lengths of the pipes, a bubble curtain may be produced across the flow through the reservoirs. Wastewater containing FOG may pass through these bubble curtains, and the FOG is drawn up to the surface. The bubbles may be negatively charged. The bubble generator may include an electrical charge-producing module to charge the bubbles negatively. This may assist the bubbles in attracting positively charged oil or FOG droplets. The bubbles may serve a dual purpose by treating the water and reducing the COD, ammonia, and heavy metal levels, improving the wastewater effluent circulation.

The FOG separator apparatus may include which a belt or wheel oil skimmer in the third reservoir, configured to skim off a floating FOG layer.

The invention extends to a method of separating FOG using the FOG separator apparatus as defined above, the method including:
permitting overflow at the first weir of at least FOG from the first reservoir to the second reservoir;
permitting overflow at the second weir of at least FOG from the second reservoir to the third reservoir;
syphoning, by the syphon arrangement, from the syphon inlet at the first level at least wastewater from the third reservoir when a liquid level in the third reservoir is equal to or higher than the syphon outlet at the second level which is higher than the first level; and
pumping, by the pump arrangement comprising the FOG pump and the liquid level switch provided in the third reservoir at a third level which is higher than the second level, from the pump inlet in the third reservoir between the first and second levels, when the liquid level switch is triggered in response to the liquid level in the third reservoir being at or higher than the third level.

BRIEF DESCRIPTION OF DRAWINGS

The invention will now be further described, by way of example, with reference to the accompanying diagrammatic drawings.

In the drawings.

DETAILED DESCRIPTION OF EXAMPLE EMBODIMENT

The following description of an example embodiment of the invention is provided as an enabling teaching of the invention. Those skilled in the relevant art will recognise that changes can be made to the example embodiment described, while still attaining the beneficial results of the present invention. It will also be apparent that some of the desired benefits of the present invention can be attained by selecting some of the features of the example embodiment without utilising other features. Accordingly, those skilled in the art will recognise that modifications and adaptations to the example embodiment are possible and can even be desirable in certain circumstances and are a part of the present invention. Thus, the following description of the example embodiment is provided as illustrative of the principles of the present invention and not a limitation thereof.

Figure 1:
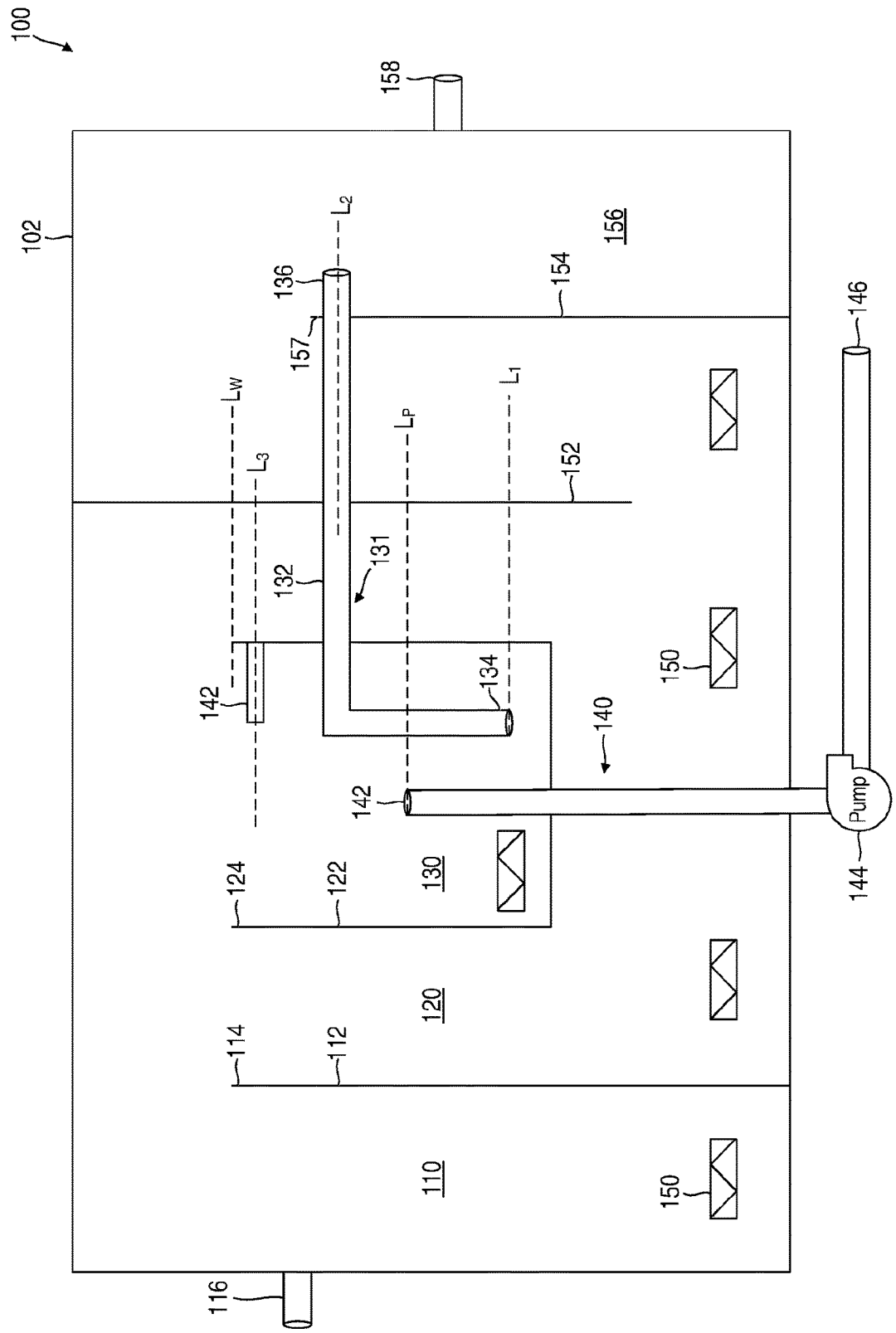
FIG. 1 shows a schematic side view of a first embodiment of a FOG separator apparatus (without liquid), in accordance with the invention.

FIG. 1 illustrates a FOG separator apparatus 100 in accordance with the invention. The FOG separator apparatus 100 is intended to separate FOG from wastewater containing FOG. (It will be appreciated that even FOG after separation may contain traces of non-FOG or wastewater and that wastewater after separation may contain traces of FOG.)

The FOG separator apparatus 100 has an enclosure or housing 102 which houses various internal structures. The enclosure 102 may include an access opening (like a door or hatch) to permit access inwards. In one embodiment, the enclosure 102 is a standard 20 ft (~6.1 m) shipping container but the specifics of the enclosure 102 are not germane to the invention. However, the enclosure 102 may be modular in that it can be linked to other, similar enclosures.

The FOG separator apparatus 100 has, within the enclosure 102, at least three reservoirs 110, 120, 130 (or chambers, troughs, or other liquid containing structures). A first reservoir 110 is defined (at least partially) by a first wall 112. The first reservoir 110 may also be defined by a lining (not illustrated) of the enclosure 102. The first wall 112 defines a first weir 114 at an upper end thereof, over which liquid may flow. A wastewater inlet 116 is provided from outside the enclosure 102 to the first reservoir 110.

The FOG separator apparatus 100 has a second reservoir 120 which is separated from the first reservoir 110 by the first wall 112 (and may also be defined by other walls and/or the lining of the enclosure 102). Liquid (which, in use, will be wastewater containing FOG) will be permitted, when it reaches an appropriate height, to overflow the first weir 114 from the first reservoir 110 to the second reservoir 120. The first weir 114 is provided at a weir level ($L_W$) and liquid may have to be above this level ($L_W$) to overflow the first weir 114.

A third reservoir 130 is provided adjacent the second reservoir 120 and separated therefrom by a second wall 122. In this embodiment, the third reservoir 130 is surrounded (at sides and a bottom) by the second reservoir 120; the third reservoir 130 may be defined by a trough or tub provided in an upper portion of the second reservoir 120. The second wall 122 defines a second weir 124 to permit overflow of liquid (predominantly FOG, in use) from the second reservoir 120 to the third reservoir 130. The second weir 124 is at the same weir level ($L_W$) as the first weir 114. (Although the third reservoir 130 is illustrated as being square or rectangular, it may well be configured to have other profiles, e.g., U-shaped, V-shaped, inclined floor, etc.)

A syphon arrangement 131 is provided partially inside the third reservoir 130. The syphon arrangement 131 includes a syphon tube 132 which provides a syphon inlet 134 inside the third reservoir 130 at a first level ($L_1$) and a syphon outlet 136 outside the third reservoir 130 at a second level ($L_2$) which is higher than the first level ($L_1$). The syphon arrangement 131 may be purely passive, having no active pump or drive means and merely being acted on by gravity and fluid pressure. Accordingly, a syphon action may occur when a liquid level in the third reservoir 130 reaches or exceeds the second level ($L_2$) drawing liquid from a lower portion of the third reservoir 130 and the syphon action will break when the liquid level in the third reservoir 130 falls below the second level ($L_2$). If the syphon arrangement 131 includes an active pump (not illustrated), this could be actuated by a sensor in the form of a liquid level switch 143 when it detects a high ratio of water to FOG in the third reservoir 130.

A pump arrangement 140 is also provided predominantly in the third reservoir 130. The pump arrangement 140 comprises an active (e.g., electrically driven) pump 144 having a pump inlet 142 at a pump inlet level ($L_P$) inside the third reservoir 130. The pump inlet level ($L_P$) is between the first and second levels ($L_1$, $L_2$). A pump outlet 146 is provided outside the enclosure 102. However, the pump arrangement 140 also includes the liquid level switch 143 provided inside the third reservoir 130. The liquid level switch 143 is at a third level ($L_3$) which is higher than the first and second levels ($L_1$, $L_2$) and lower than the weir level ($L_W$). Accordingly, when the liquid level in the third reservoir 130 reaches the third level ($L_3$), the pump 144 will be triggered and will begin pumping liquid from the first level ($L_1$) within the third reservoir 130. The pump inlet 142 may include an elbow aimed towards a surface to adjust a level of the suction of FOG downwards to the pump 144, through a vortex; the elbow may suck straight down rather than out from a side of the second wall 122.

The liquid level switch 143 could be a binary switch configured to sense mere liquid level and nothing more. Instead of a simple switch, the sensor could be a more advanced sensor/switch configured to sense both a level and a liquid concentration at that level, or a liquid/FOG concentration only. For example, the liquid level switch 143 may be a capacitive sensor configured to detect a FOG concentration at the level it is positioned. For example, when the FOG concentration passes 95% (less than 5% water content) at that level, then the pump 144 is activated, extracting the concentrated FOG before it can enter the syphon inlet 134. This concentration (e.g., 95%) may be adjustable to calibrate and balance flow within the apparatus 100.

The FOG separator apparatus 100 has a plurality of heaters or heating elements 150 spaced along its length with various reservoirs 110, 120, 130. The heaters 150 are configured to warm any liquid contained in the reservoirs 110, 120, 130, the function of which will become apparent below with reference to the functional description (FIG. 2) of the FOG separator apparatus 100.

The second reservoir 120 has a baffle 152 provided in the second reservoir 120. The baffle 152 may only permit underflow of liquid and thereby limit outflow of FOG because only denser wastewater will be low enough to underflow the baffle 152 (or similar liquid-directing structure). A fourth reservoir 156 is separated by a third wall 154 defining a third weir 157 from the third reservoir and provides an exit reservoir for wastewater which has either (1) underflowed the baffle 152 from the second reservoir 120 or (2) been syphoned out from the third reservoir 130. The fourth reservoir 156 has a main outlet 158 connected thereto for removal of wastewater therefrom.

Figure 2:
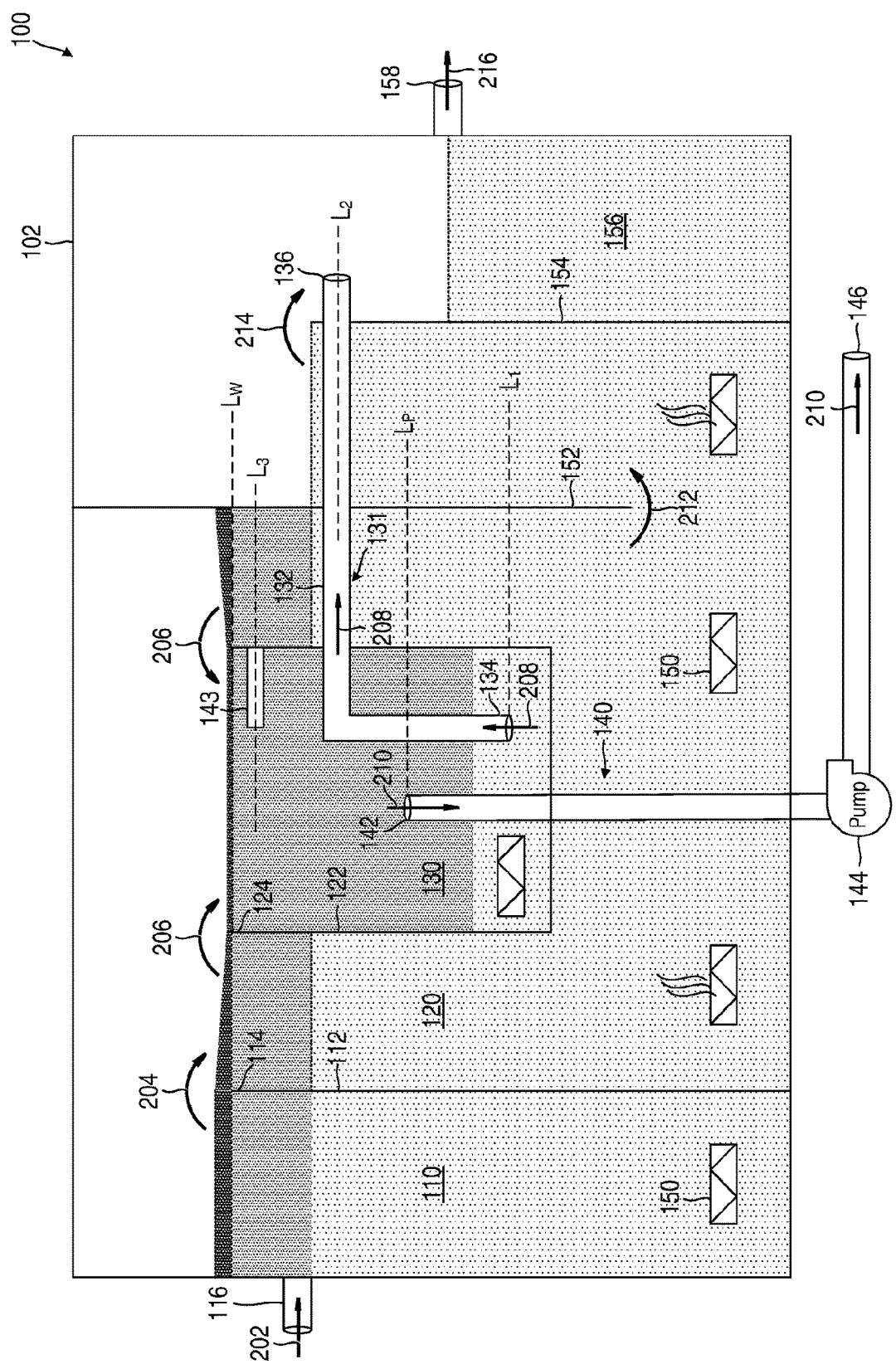
FIG. 2 shows a schematic side view of the FOG separator apparatus of FIG. 1 with liquid.

FIG. 2 illustrates the FOG separator apparatus 100 filled with liquid at various levels which may better illustrate dynamic operation and liquid flow paths. FOG is, by its nature, less dense than water, and therefore tends to rise and float in water. However, at room temperatures and below, FOG may be highly viscous (not readily flowable) or solid. Accordingly, the wastewater and FOG is warmed to a temperature of 40-70° C., usually 45-60° C., at which temperature the FOG is sufficiently flowable to be considered liquid and any references to liquid include references to FOG.

At first, the first reservoir is filled (arrow 202), via the wastewater inlet 116, with wastewater containing FOG. The wastewater may already be warmed and may have come from the FOG collector disclosed in PCT/IB2020/050334. The heaters 150 (or at least, the heater 150 in the first reservoir 110) are powered to ensure that the wastewater remains warm.

As the first reservoir 110 is filled, the liquid level rises and when it reaches the weir level ($L_W$) it begins to overflow (arrow 204) the first weir 114. As the FOG in the wastewater is less dense and therefore at a top layer, it will overflow the weir 114 first and the second reservoir 120 will predominantly be filled with FOG, or at least the wastewater in the second reservoir 120 is more concentrated (contains more FOG) than the wastewater in the first reservoir 110. The darker shading in the reservoirs 110, 120, 130 represents more concentrated FOG while the lighter shading represents more diluted wastewater.

(Although not illustrated in FIGS. 1-2, the first wall 112 may include a screen or apertures bored therein. This may permit a controlled amount of wastewater to flow from the first reservoir 110 to the second reservoir 120. This may serve to keep the second reservoir 120 flooded and to ensure circulation of wastewater.)

As the second reservoir 120 fills, its liquid contents will be more concentrated than that of the first reservoir 110 and the FOG within the liquid will, once again rise. As it reaches the weir level ($L_W$), it will overflow (arrow 206) the second weir 124 into the third reservoir 130. This overflow 206 occurs at both sides of the third chamber 130. The liquid that then fills the third chamber 130 will be even more highly concentrated FOG. The heaters 150 remain on, ensuring that all of the liquid within the enclosure 102 remains at a warm, fairly consistent temperature. As the third reservoir 130 fills, various actions may be triggered.

When the liquid level in the third reservoir 130 reaches the second level ($L_2$), the syphon action begins through the syphon arrangement 131. The syphon inlet 134 draws (arrows 208) more diluted wastewater from the first level ($L_1$). A thickness of the syphon tube 132 may be configured to control a speed or volume of the syphoning action. For example, the syphon tube 132 may be relatively thin, meaning that a small volume of wastewater is syphoned 208 out slower than a volume that overflows the second weir 124, allowing the liquid level within the third reservoir 130 to increase. There may also be a controllable valve in-line with the syphon tube 132.

When the liquid level in the third reservoir 130 reaches the third level ($L_3$), the liquid level switch 143 is triggered which in turn actuates the pump 144. This draws (arrow 210) liquid from the pump inlet 142 which, at that level ($L_P$), is predominantly FOG. The pump outlet 146 directs the pumped FOG externally, e.g., to a FOG refinement or processing plant, or for safe disposal.

Spacing between the respective levels ($L_1, L_2, L_3, L_P, L_W$) in FIGS. 1-2 is not necessarily to scale and may be varied according to desired configurations. For example, the second and third levels ($L_2, L_3$) may be spaced relatively closely (e.g., a few cm) together.

Wastewater is delivered to the fourth reservoir 156 either from the second reservoir 120 by underflowing (arrow 212) the baffle 152 and overflowing (arrow 214) the third weir 157 or from the syphon arrangement 131 (arrow 208). The main outlet 158 may direct (arrow 216) wastewater (purer or more diluted wastewater than that which entered 202 the wastewater inlet 116) to where it may be reused, purified, drained, etc. In one example, the main outlet 158 is fluidically connected to an inlet of the FOG collector disclosed in PCT/IB2020/050334, for series or circular operation. When the majority of FOG is removed, the apparatus 100 may enter "maintenance/low power mode" where temp is maintained within the apparatus 100, ready to flush the reservoirs or source of FOG and wastewater to liquefy and "drag" the FOG back through the apparatus 100.

Regardless of ultimate destinations, in this way, diluted (that is, with little or no FOG) wastewater is directed 216 out of the main outlet 158 and concentrated FOG (that is, with little or no wastewater) is directed 210 out of the pump outlet 146.

Figure 3:
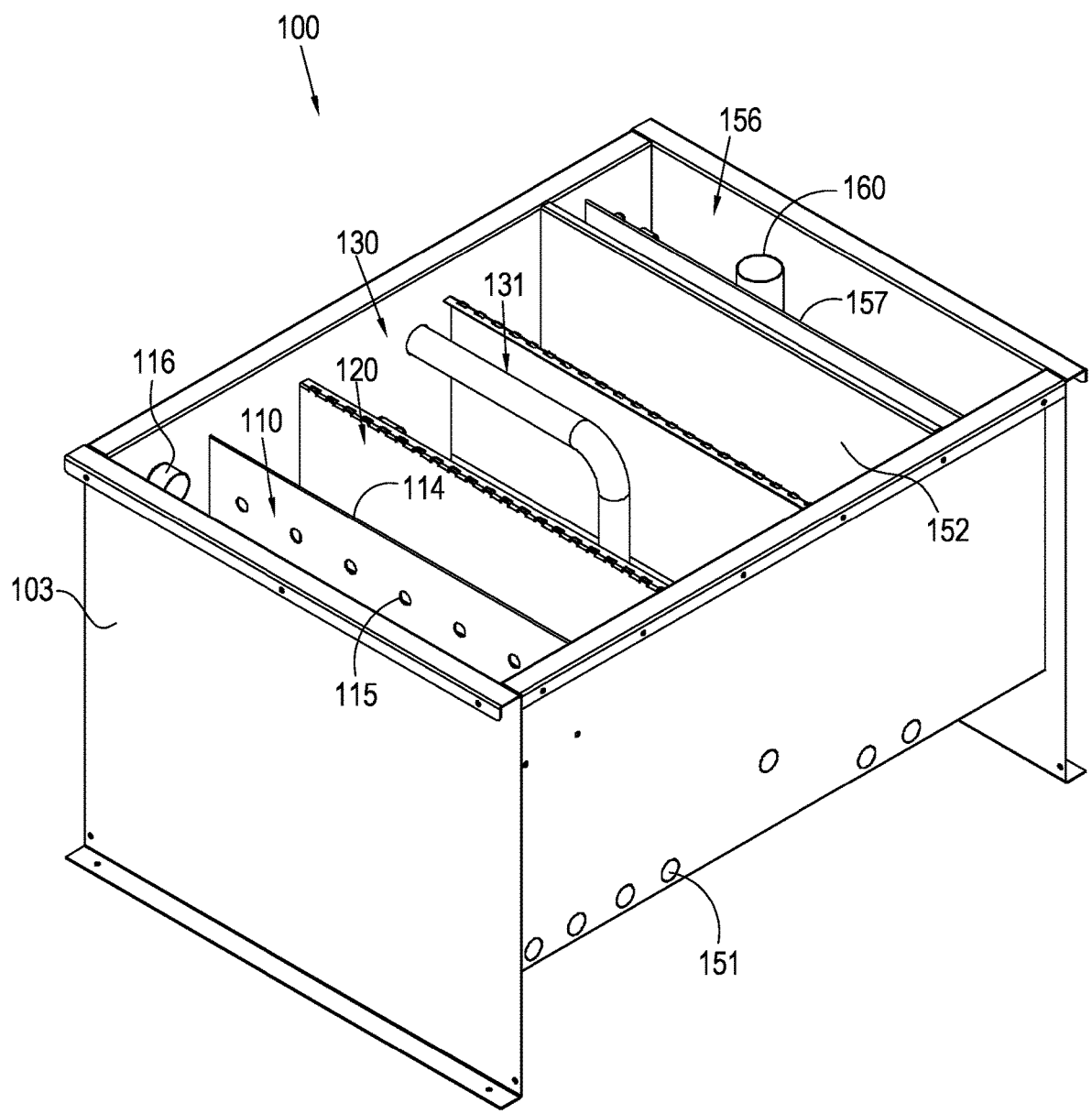
FIG. 3 shows a three-dimensional view of a second embodiment of a FOG separator apparatus (without liquid), in accordance with the invention.
Figure 4:
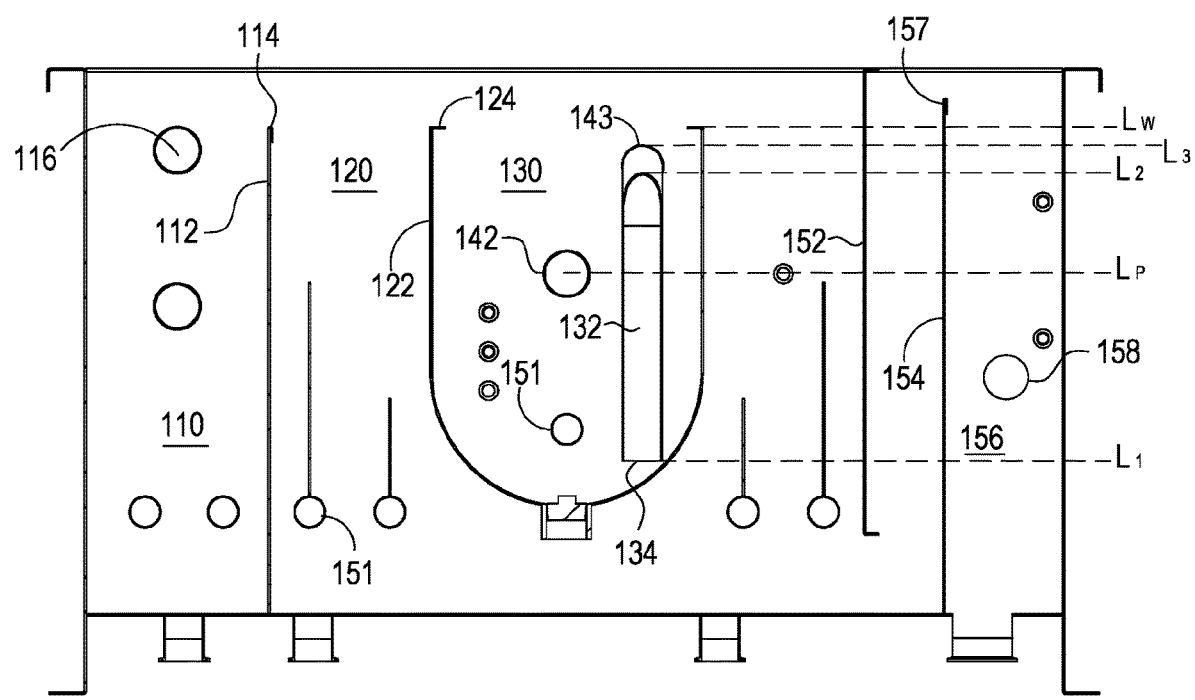
FIG. 4 shows a cross-sectional view of the FOG separator apparatus of FIG. 3.

FIGS. 1-2 are more schematic in that they are intended more for illustrative purposes. FIGS. 3-4 are drawings of an actual prototype built by the Applicant which may be more suitable for implementation and dimensions may be more realistic. The same numerals in FIGS. 3-4 as in FIGS. 1-2 refer to the same or similar parts.

FIGS. 3-4 also illustrate the FOG separator apparatus 100 but an illustrated exterior may be a lining or shell 103 which is intended to fit snugly inside the outer enclosure of FIGS. 1-2. The shell 103 may be secured (e.g., using nuts and bolts or welding) inside the enclosure 102. The FOG separator apparatus 100 in this embodiment does not include heaters 150 but rather has apertures 151 provided in sides of the shell 103 to permit sealed tubes (not illustrated) to pass through the various reservoirs 110, 120, 130, the tubes being configured either (1) to carry warm water and thus to heat the wastewater radiator-fashion, rather than directly via an electrical element or (2) to house ceramic heating elements which will then be protected from solids and FOG settling directly on the elements and preventing burn out, also being easier to replace.

The shell 103 may be completely insulated and sealed within the outer enclosure 102. This may assist in conserving heat and containing odour.

The first wall 112 defines apertures 115 therein to provide another flow path (in addition to over the first weir 114) for liquid from the first reservoir 110 to the second reservoir 120. This may assist in circulation of wastewater and ensure that the second reservoir 120 remains flooded. The first wall 112 may thus function (at least partially) as a screen or mesh.

Figure 5:
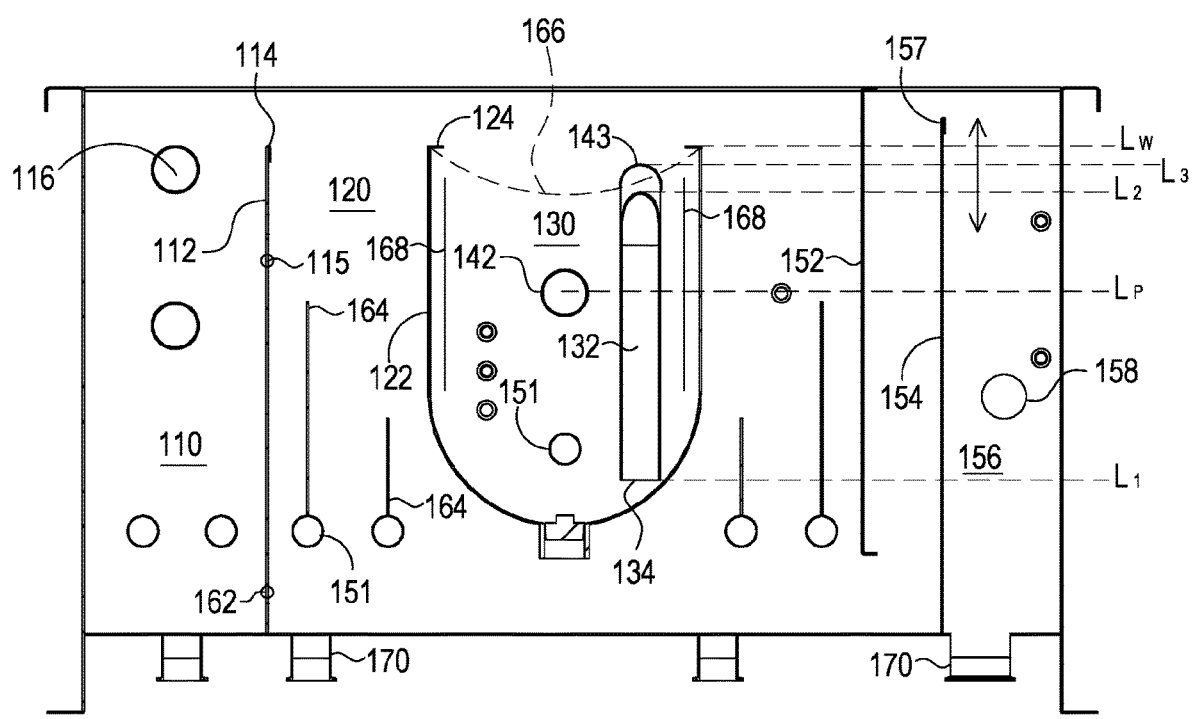
FIG. 5 shows a cross-sectional view of the FOG separator apparatus of FIG. 4 with additional features.

The second weir 124 may have a corrugated surface to increase an active weir area and/or to locate a mesh screen (see FIG. 5). An overflow 160 is provided in (or above) the fourth reservoir 156 as a failsafe, for release of pressure, and to provide DSEAR certification.

Another difference is that the third reservoir 130 has a U-shaped profile and is effectively a trough which is mounted within, but at the same upper level as, the second reservoir 120.

The third weir 157 is at a higher level than the level ($L_W$) of the first and second weirs 114, 124. Other than these constructional differences, the FOG separator apparatus 100 works on the same principle. However, this third weir 157 is height-adjustable a during normal operation may well be at the same height or lower than the other weir level ($L_W$). More specifically, the third weir 157 is adjustable above and below ($L_W$), where this adjustment controls or at least influences the fluid levels in the various reservoirs 110, 120, 130, 156. If there is very little FOG at the source, or low volumes of FOG entering the wastewater inlet 116, then the third weir may 157 may need to be level with, or even slightly higher than, the weir level ($L_W$) to allow FOG, sitting on the liquid surface to flow into the third reservoir 130. In an industrial application where large volumes of FOG are present, then the third weir 157 may be equal to or less than the height of the weir level ($L_W$) because a thick layer of FOG on the surface will easily spill over the second weir 124 and may be of a lower water content.

FIG. 5 illustrates some additional features. The apertures 115 illustrated in FIG. 3 are actually upper apertures and the first wall 112 also defines lower apertures 162. These lower apertures 162 permit cooler and relatively FOG-free wastewater to flow directly from the first reservoir 110 to the second reservoir 120 without needing to overflow the first weir 114. This wastewater may continue its path beneath the third reservoir 130 and under the baffle 152 towards the fourth reservoir 156.

The tubes/apertures/heating elements 151 have fins 164 connected to them which act as heat-radiating fins to distribute heat form the tubes/apertures/heating elements 151 more quickly and evenly to the liquid within the first and second reservoirs 120, 130.

The third reservoir 130 has a U- or V-shaped screen 166 provided at its surface, inwardly of the second weir 124. This screen 166 may be configured for screening smaller particulate matter.

The third reservoir 130 has two baffles 168 provided parallel with and just inside of its side walls 122. These baffles 168 direct any denser FOG-free wastewater which has overflowed the second weir 124 downwardly towards a bottom of the third reservoir 130 to the syphon inlet 134.

A bottom of the shell 103 defines a plurality of sump recesses 170. Denser particles and solids may collect in the sump recesses 170. Also, the bottom of the shell 103 may be V- or U-shaped (not illustrated) to channel the denser solids towards the sump recesses 170. A manifold system (not illustrated) comprising a series of pipes connected to the sump recesses and a valve or pump is provided to drain or remove solids build-up within first, second, and fourth reservoirs 110, 120, 156. This draining may be manual or automatic, depending on the configuration.

Although not illustrated, much of the operation of the FOG separator apparatus 100 may be monitored and controlled electronically. Accordingly, the FOG separator apparatus 100 may include a plurality of sensors (e.g., temperature sensors, flow rate sensors, liquid density sensors, etc.) connected at various points. These sensors may be connected to a controller. The controller may be configured to provide an indication of operating conditions. The controller may be connected to a user interface to provide the indication via the user interface and to receive commands therefrom. In turn, the controller may be configured to control one or more of:

a temperature of the wastewater by controlling the heaters 150 or temperature of the water in the tubes in the apertures 151;
a flow rate of the main input 116;
a speed or status (e.g., on or off) of the pump 144;
a flow rate of the syphon arrangement 131 by controlling a valve (not illustrated) in-line with the syphon tube 132; and/or
a flow rate of the main outlet 158.

By controlling these characteristics (individually or in combination), various levels with the reservoirs 110, 120, 130, 140 may be regulated and amounts or concentrations of FOG or wastewater, either individually or relative to each other, extracted from the FOG separator apparatus 100 may be regulated.

Other advantages of the present invention may include (depending on the specific embodiment or version of implementation):

Intelligent controls will shut off pumps or redirect flow if a leak is detected.
Data is gathered and reported to remote sites.
Early notification of component failure (e.g., notify a maintenance team remotely and tell them that, for example, pump 1 has just stopped working).
Data can be exported and interrogated with machine learning to try to predict future failures in advance.
The apparatus 100 can be insulated and sealed to obtain a DSEAR Certification.
This insulation and sealing may keep smell locked inside the plants, for very low odour.
The apparatus 100 may be highly scalable and modular. For example, in a prototype plant the Applicant has set up, two apparatus 100 run in parallel.
A footprint of the apparatus 100 may be made wider and shallower, to increase the surface area, allowing for greater separation The apparatus 100 may be largely unmanned and may include automatic flushing and very low maintenance.

The apparatus 100 may include a V-shaped channel.

The apparatus 100 may operate using solar or heated sync from available source.

The third reservoir 130 may incorporate a U-shaped screen for fine solids catchment.

The third reservoir 130 may incorporate baffles for focusing water away from the FOG pump.

The invention claimed is:

1. A FOG (Fats, Oil, or Grease) separator apparatus which includes:
   a first reservoir or chamber having a wastewater inlet configured to receive wastewater containing FOG;
   a second reservoir or chamber which is separated from the first reservoir by a first weir configured to permit overflow of at least FOG from the first reservoir to the second reservoir;
   a third reservoir or chamber separated from the second reservoir by a second weir configured to permit overflow of at least FOG from the second reservoir to the third reservoir;
   a syphon arrangement having a syphon inlet provided in the third reservoir at a first level and having a syphon outlet provided outside the third reservoir at a second level which is higher than the first level; and
   a pump arrangement comprising a FOG pump and a sensor provided in the third reservoir at a third level which is higher than the second level, wherein the pump has a pump inlet in the third reservoir above the first level, and wherein the pump is activated by the sensor in response to a liquid level or concentration in the third reservoir triggering the sensor.

2. The FOG separator apparatus as claimed in claim 1, in which the syphon arrangement:
   is a self-priming syphon arrangement;
   is primed, and starts syphoning, in response to a liquid level in the third reservoir being at or rising above the second level; and
   stops or experiences a syphon break in response to the liquid level in the third reservoir being at or falling below the second level.

3. The FOG separator apparatus as claimed in claim 1, in which the syphon arrangement includes a pump and/or valve to regulate flow.

4. The FOG separator apparatus as claimed in claim 1, in which:
   the sensor is a capacitive sensor configured to sense a FOG concentration at the level of the sensor in the third reservoir; and
   the FOG separator apparatus is configured to activate the pump when the FOG concentration at the level of the sensor reaches or exceeds a pre-definable concentration.

5. The FOG separator apparatus as claimed in claim 1, in which:
   the sensor is a liquid level switch; and
   the FOG separator apparatus is configured to activate the pump when the liquid level in the third reservoir reaches or exceeds a level of the sensor.

6. The FOG separator apparatus as claimed in claim 1, which includes one or more heaters provided in one or more of the first reservoir, the second reservoir, and/or the third reservoir.

7. The FOG separator apparatus as claimed in claim 6, in which the heaters are configured to warm or heat the wastewater containing FOG to 40° C.-80° C. (~104° F.-176° F.).

8. The FOG separator apparatus as claimed in claim 1, in which the third reservoir is contained or nested within the second reservoir.

9. The FOG separator apparatus as claimed in claim 1, in which:
   the FOG separator apparatus includes a fourth reservoir or chamber separated from the second reservoir by a third weir;
   the syphon outlet is provided in the fourth reservoir; and
   wastewater syphoned by the syphon arrangement is deposited into the fourth reservoir and permitted to overflow the third weir and return to the second reservoir.

10. The FOG separator apparatus as claimed in claim 9, in which a height or level of the third weir is adjustable, thereby to permit tuning or adjustment of the overflow of the third weir.

11. The FOG separator apparatus as claimed in claim 1, in which:
    the first and second weirs are at the same level; and/or
    the first weir and/or the second weir are above the third level.

12. The FOG separator apparatus as claimed in claim 1, in which:
    the FOG separator apparatus includes a first wall which defines the first weir and which separates the first and second reservoirs from each other; and
    the first wall defines one or more apertures or vents, at one or more levels beneath the first weir, to permit wastewater containing FOG to flow from the first reservoir to the second reservoir not only over the first weir but also through the apertures.

13. The FOG separator apparatus as claimed in claim 1, in which the pump directs the FOG away from the reservoirs to an external FOG treatment system, the FOG separator apparatus therefore being considered a FOG concentrator.

14. The FOG separator apparatus as claimed in claim 1, which includes:
    an outer enclosure to accommodate the reservoirs; and
    a lining or shell provided inside the outer enclosure, the lining or shell providing at least a base of the first and/or second reservoirs.

15. The FOG separator apparatus as claimed in claim 1, which is modular and in which plural FOG separator apparatus are configured to be linked in parallel and/or in series.

16. The FOG separator apparatus as claimed in claim 1, in which:
    the FOG separator apparatus includes a bubble generator to generate bubbles in one or more of the reservoirs; and
    the bubble generator is configured to provide bubbles of primarily $O_2$ or $O_3$.

17. The FOG separator apparatus as claimed in claim 1, which includes a belt or wheel oil skimmer in the third reservoir, configured to skim off a floating FOG layer.

18. A method of separating FOG using the FOG separator apparatus as claimed in claim 1, the method including:
    permitting overflow at the first weir of at least FOG from the first reservoir to the second reservoir;
    permitting overflow at the second weir of at least FOG from the second reservoir to the third reservoir;
    syphoning, by the syphon arrangement, from the syphon inlet at the first level at least wastewater from the third reservoir when a liquid level in the third reservoir is equal to or higher than the syphon outlet at the second level which is higher than the first level; and pumping, by the pump arrangement comprising the FOG pump and the sensor provided in the third reservoir at a third level which is higher than the second level, from the pump inlet in the third reservoir between the first and second levels, when the liquid level switch is triggered in response to the liquid level or concentration in the third reservoir triggering the sensor.

* * * * *